Stout & Richardson.
Hat Ironing Machine.
No. 71,662. Fig. 1. Patented Dec. 3, 1867.
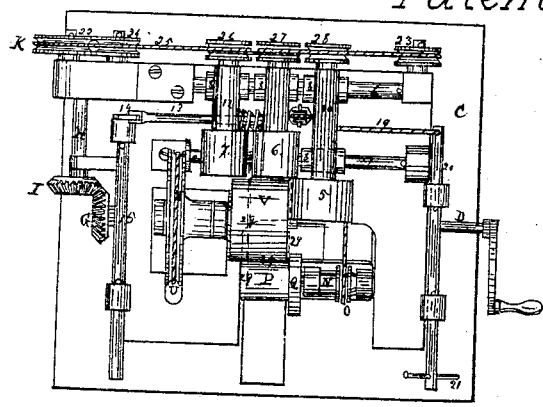
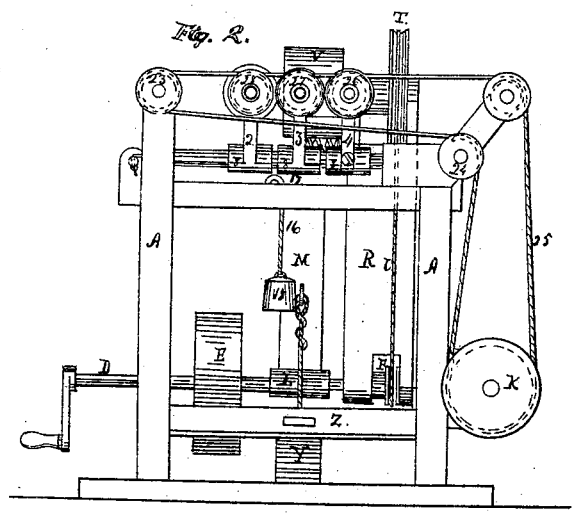
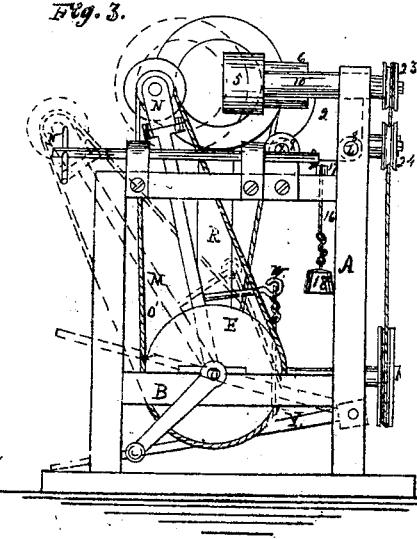
Witnesses
Inventor
George B. Stout
John E. Richardson
by Crosby, Halstead & Gould
their Attorneys

United States Patent Office.

GEORGE W. STOUT AND JOHN C. RICHARDSON, OF NEWARK, NEW JERSEY, ASSIGNORS TO THEMSELVES, JAMES DAVIS, JR., AND SAMUEL R. HAWLEY.

*Letters Patent No. 71,662, dated December 3, 1867.*

IMPROVEMENT IN HAT-IRONING MACHINES.

*The Schedule referred to in these Letters Patent and making part of the same.*

TO ALL WHOM IT MAY CONCERN:

Be it known that we, GEORGE W. STOUT and JOHN C. RICHARDSON, both of the city of Newark, county of Essex, and State of New Jersey, have invented certain Improvements in Hat-Finishing Machines; and we do hereby declare that the following, taken in connection with the drawings which accompany and form part of this specification, is a description of our invention sufficient to enable those skilled in the art to practise it.

Our invention relates to that class of machines having for their object the ironing or finishing of hats.

It consists mainly in such novel construction of a machine as to admit of the simultaneous ironing or finishing of the top of the crown, the sides of the crown, and also both sides of the brim, thus enabling the operator to finish a hat complete at one operation.

It further consists in numerous details, hereinafter set forth, which serve to contribute towards the above general result.

Figure 1 of the drawings represents a plan view,

Figure 2 a rear view, and

Figure 3 a side view of a machine illustrating our invention.

The red lines indicate the position of the swinging arm which carries the side iron, and also the position of the hat-block, when the same are thrown out of their operative positions.

A represents the framework of a machine embodying our invention, and which may be made of any suitable form or material adapted to receive and sustain the machinery hereinafter described. Cross-bars B serve to give bearings or supports to a lower system of shafting, and the top or table C of the framework serves to support an upper system of shafting, and other parts of the operative machinery. D is the main shaft of the machine, and which may be driven by power or by hand. This shaft revolves in suitable bearings in cross-bars B, and there are secured upon it, and so as to revolve with it, a drum, E, a pulley, F, and at its outer extremity a bevelled pinion, G. Upon the outer side of the framework, and at right angles to shaft D, and supported in suitable bearings in brackets, or otherwise, as may be found convenient, is another shaft, H, on one end of which is a bevelled gear, I, driven by the gear G, and on the other end a pulley, K, a cord or band from which drives, as hereafter described, a series of pulleys for revolving certain of the irons. Upon the main shaft is placed a sleeve, L, rigidly secured to which, and preferably cast in one piece with it, is a swinging arm, M, to the upper end of which is pivoted, so that it may, when desirable, turn thereon, a head-stock, N. This head-stock has bearings or supports for a hollow or tubular shaft, which carries a pulley, O, by which it is driven, and also a cylindrically-shaped hollow iron, P, having a circular disk or flange, Q. A swinging arm, R, through the lower end of which the main shaft passes, and upon which the arm swings, carries at its upper end a shaft, upon which is secured a large pulley, T, and upon whose end is secured the hat-block, which may be of elliptic or other form, as may be found desirable. A cord or band, U, from pulley F on the main shaft, imparts motion to the large pulley T and hat-block V. From the arm M extends a rod or side arm, W, to which is attached a cord or chain. This cord is passed over a guide-pulley, X, placed upon any convenient part of the frame, and its other extremity is secured to a treadle, Y, which projects from a cross-bar, Z, the latter being pivoted or centred at its ends, so as to rock in its bearings in the frame. A belt, O', passing from the drum E up and around the pulley O, serves to drive it and the side iron P, which is upon the shaft, with it, and inasmuch as the drum E and pulley F have a common centre with both of the swinging or rocking arms M and R, the changes in the positions of these about their centres of motion do not in anywise affect the tension or the proper action of the cords or belts which drive them. Two rods 1 1, placed parallel with each other, are firmly secured to the frames, and above the table, as shown. Upon these rods are supported the carriages or frames 2 3 4, which carry respectively the hollow rim-irons 6 7, and the iron 5 for finishing the crown. To admit of a change of position of these frames, and the irons upon them, relatively to each other and to the hat, when desired, each frame is provided with two sleeves, through which the rods 1 respectively pass, and these rods thus afford them firm support, and allow of their being slid thereon. Each of these frames or carriages has a bearing at its upper part for the tubular revolving shafts 10 11 12, and also a hollow cylindrical finishing-iron, numbered respectively 5, 6, 7. The brim-irons 6 7 we make in cylindrical form, and they are firmly secured to their respective shafts, that they may revolve with them. A spiral spring so connects the carriages 3 4 as to exert a constant tendency to draw closely together the brim-irons, whilst, for the purpose of separating them when introducing between them or removing from between them the hat-brim, we have provided a sliding push-rod 13 to press the carriage 3 away from the carriage 4. This rod slides through a suitable hole in carriage 4, and has at its outer end a pivoted connection with a small side arm of crank 14, secured upon the end of a rod, 15, which latter being turned in its bearings by the operator, actuates the crank, and so pushes the carriage 3, as above stated. The spring, when acting to draw the carriages toward each other again, forces the slide rod back to its normal position. The carriage 2, which supports the iron for finishing the top of the crown, has also a provision for withdrawing it at will from its action upon the hat. To this carriage a cord, 16, is attached, which, passing over a pulley, 17, properly located in the top of the table, serves, by means of a weight, 18, attached to its free end, to exert a constant tendency to keep the iron 5 in contact with the top of the hat-crown. Another cord, 19, running from the outer side of this carriage, has its outer end connected with a rod, 20, supported in suitable bearings. The crank or handle 21 of this rod being turned by the operator, the cord is thus wound or coiled upon the rod, and so pulls outward the carriage and its iron, overcoming the force of the weight. The pulleys on these carriages need to be so driven as to allow of their change of position without in anywise disturbing the driving-mechanism or appliances. For this purpose we place upon the frame of the machine, or upon brackets or supports secured thereon, and in any suitable positions, guide-rollers 22 23 24. An endless driving-belt or cord, 25, is then passed, as shown, from the pulley K up and over the guide-roller 22, thence to and around each of the pulleys 26 27 28 successively, thence over guide-pulley 23, thence (in returning) to and over guide-pulley 24, and then back to pulley K, all as shown. The sleeve L admits of being shifted laterally upon the main shaft, and thus allows of the adjustment of the side iron P for hat-crowns of different heights. The flange Q, which may also be hollow like the iron P, of which it forms a part, serves, in connection with it, to give a sharp and true finish to the edge or angle formed by the crown and top of the hat. The irons and their shafts all being hollow or tubular, the former are readily heated within to the required degree by simply introducing into the latter any suitable conducting pipes, having a common source of supply. These may be gas-pipes, having proper jets or burners within the irons, or they may be ordinary pipes for the admission of steam, superheated steam, or hot air. These pipes within the tubes we connect to the supply-pipes by a flexible pipe or, swivel-joint, or in any other well-known manner, in order to admit of the motions and the changes of position of the irons, hereinbefore mentioned.

The operation of the machine is as follows: A hat, 29, is placed upon the hat-block, the brim-irons 6 7 being separated, as above described, to admit the hat-brim between them, and the iron 5, with its carriage 2, being drawn away from the hat-block to admit of placing the hat thereon. The spring then draws the irons 6 and 7 against the brim, and the weight 18 pulls the crown-iron 5 against the top of the crown. The foot of the operator being now applied to the treadle Y, the side crown-iron is thereby drawn against the side of the hat, and the main shaft being set in motion, the hat-block and hat are caused to revolve, and all the irons now revolving in conjunction, every part of the hat is finished simultaneously. When the hat is finished the machine is stopped, and the iron 5 being pulled back, and the irons 6 and 7 being separated, and the foot removed from the treadle, the hat can be taken from the hat-block and a new one substituted. When desirable, a form corresponding in its periphery to the elliptic or eccentric form of the hat-block may be used, and so applied to the shaft on which the hat-block is fastened as to give to the block a positive motion to and fro, and thereby always revolving the surface of the hat at a uniform distance from the tips of the brim-irons. The shafts that carry the brim-irons may also be set at an angle towards instead of parallel with one another, and they may be driven by gears, or other suitable mechanism, to admit of the brim-irons being tapered either from their bases or tips, as may be found desirable.

We claim as our improvements and invention in hat-finishing machines, as follows:

1. A pair of irons operating in conjunction to iron simultaneously both sides of the brim, substantially as described.

2. The combination, in the same machine, of revolving irons for finishing the brim, and also the top and sides of the crown.

3. Finishing-irons operating simultaneously upon the top of the crown, both sides of the brim, and also upon the sides of the crown.

4. So combining the irons, which operate upon the brim only, that they may be readily separated from each other at will, as and for the purposes described.

5. The combination of the brim-irons with their connecting spring, rod, and crank, substantially as and for the purpose set forth.

6. The combination of the brim-irons with their driving-mechanism, so as to admit of the shifting of the positions of the irons without arresting the motions derived from the driving-mechanism, substantially as set forth.

7. The combination of the brim-irons and the top iron with their driving-mechanism, so that the relative positions of the irons may be changed, for the purpose set forth.

8. The combination of a revolving hat-block with revolving irons.

9. The combination of a swinging arm, which carries the side irons, with a pivoted head-stock, as and for the purpose described.

10. The combination of a swinging arm, which carries the hat-block, with a swinging arm which carries a finishing-iron.

GEORGE W. STOUT,
JOHN C. RICHARDSON.

Witnesses:
MOSES B. MACLAY,
HENRY DODSON.